United States Patent Office.

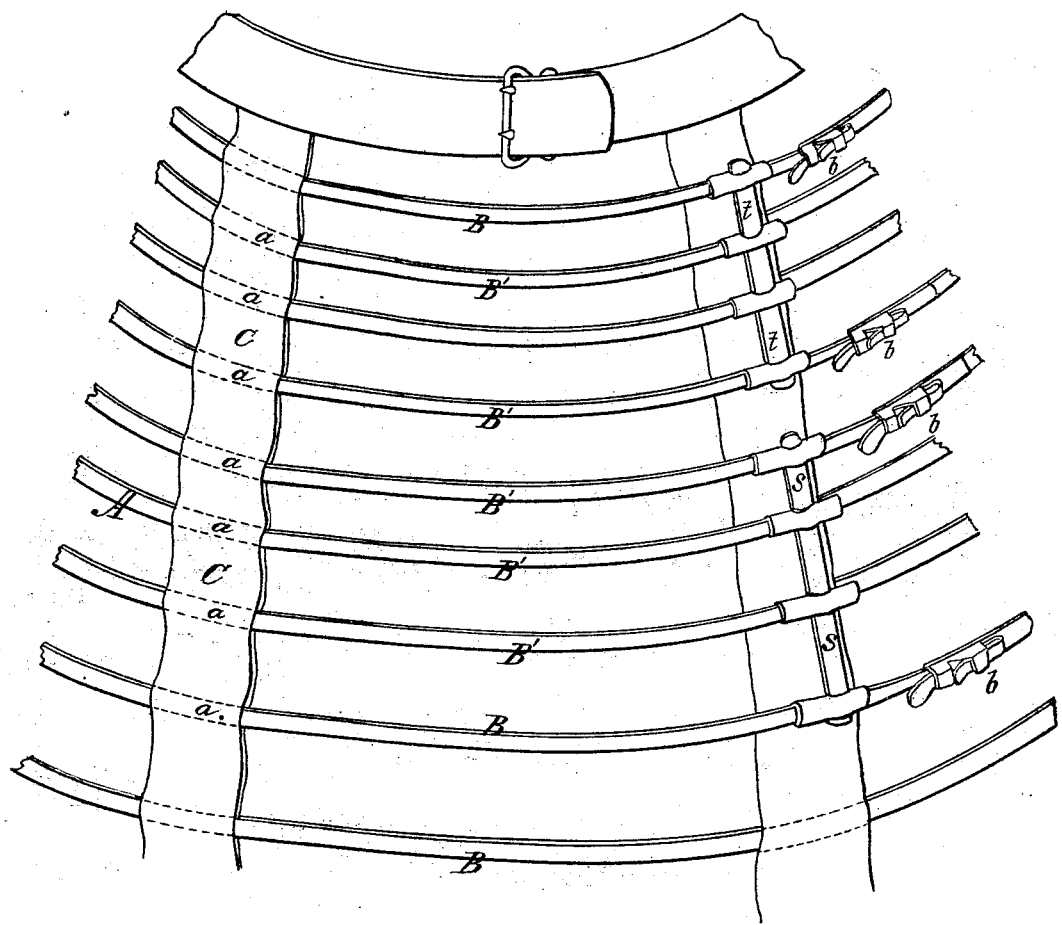

CÆSAR NEUMANN, OF NEW YORK, N. Y.

Letters Patent No. 61,088, dated January 8, 1867.

---

IMPROVEMENT IN HOOP SKIRTS.

---

The Schedule referred to in these Letters Patent and making part of the same.

---

TO ALL WHOM IT MAY CONCERN:

Be it known that I, CÆSAR NEUMANN, of the city, county, and State of New York, have invented a new and useful Improvement in Hoop Skirts; and I do hereby declare the following to be a full, clear, and exact description of the same, sufficient to enable one skilled in the art to make use of it, reference being had to the accompanying drawings, which form a part of this specification, and in which—

Figure 1 represents a perspective view of a portion of the skirt.

Figure 2 is a section through one of the clasps.

This invention consists in closing the upper portion of the skirt by clasps in such a manner that said ends can be readily fastened and unfastened when the skirt is put on or taken off, and all danger of tearing the skirts or dresses by the projecting ends of the wires is prevented.

A represents a portion of a hoop skirt, the wires B of which are secured in the pockets or shirrs $a$ of the tapes C by means of thread. The upper wires B', which in ordinary skirts are open in front to allow of putting on or taking off the skirt, are closed in my skirt by extending said wires so that their ends overlap each other, and in which position they are fastened by clasps $b$, fig. 2, which are so arranged that they can readily be unfastened when the skirt is to be put on or taken off, and fastened after the skirt is on. By these means the ends of the wires are protected and prevented from injuring the skirts or dresses worn over the hoop skirt. The clasps or fastenings of the ends may close each circle of the wires B', or they may be arranged in clusters, as in fig. 1, where the eight wires are divided into sections of four, each united by the straps $s$ and $t$, respectively, so as to permit the opening to be more readily made by unclosing but four clasps.

What I claim as new, and desire to secure by Letters Patent, is—

A hoop skirt, with its upper wires closed by means of a spring clasp, substantially as described and represented.

A hoop skirt, with its upper opening wires arranged in sections and provided with spring catches, for the purpose described.

CÆSAR NEUMANN.

Witnesses:
M. M. LIVINGSTON,
C. L. TOPLIFF.